April 3, 1962 F. A. LOSEE 3,028,487
DIGITAL PHASE DEMODULATION CIRCUIT
Filed May 1, 1958 3 Sheets-Sheet 1

INVENTOR.
FERRIL A. LOSEE,
BY Noel B. Hammond
AGENT.

DIGITAL PHASE DEMODULATION CIRCUIT

Filed May 1, 1958 3 Sheets-Sheet 2

INVENTOR.
FERRIL A. LOSEE,
BY
Noel B. Hammond
AGENT.

DIGITAL PHASE DEMODULATION CIRCUIT

Filed May 1, 1958 3 Sheets-Sheet 3

INVENTOR.
FERRIL A. LOSEE,
BY Noel B. Hammond
AGENT.

United States Patent Office 3,028,487
Patented Apr. 3, 1962

3,028,487
DIGITAL PHASE DEMODULATION CIRCUIT

Ferril A. Losee, Los Angeles, Calif., assignor to Hughes Aircraft Company, Culver City, Calif., a corporation of Delaware Filed May 1, 1958, Ser. No. 733,239
17 Claims. (Cl. 250—8)

The present invention relates to digital communications receivers and more particularly to apparatus for demodulating a carrier wave modulated by pulses having a predetermined relative carrier wave phase.

The potential advantages of using phase modulation for digital data transmission have long been recognized. Analysis indicates the superiority of phase modulation over amplitude or frequency modulation. The advantages of phase modulation include a reduction in spectrum bandwidth required for the modulated carrier wave and decreased error in interpreting received signals.

The use of a phase reference signal generated at the receiver to detect the absolute phase of transmitted pulses has been found to be unsatisfactory where ionospheric propagation of the carrier is used. This is due to transient phase shift during propagation so that the absolute phase relationship originally transmitted is no longer present at the receiver. Accordingly, most present pulse-phase communications systems incorporate the phase reference into the transmitted wave. For instance, the RF (radio frequency) phase of one carrier wave pulse may be detected relative to the RF phase of a successive carrier wave pulse. Thus, instead of transmitting absolute phase information, relative or differential phase information is transmitted and utilized at the receiver.

In order to compare the relative phase of successive pulses, the phase information conveyed by an earlier pulse must be preserved until the arrival of a later pulse. Prior art systems utilize a ringing circuit excited by the incoming signal to preserve the phase of earlier pulses by regeneration to provide a pulse-to-pulse phase reference. Such devices are based on the assumption that a received pulse has a particular phase that remains constant throughout the duration of the pulse. Hence, the absolute phase of two successive pulses is determined first and then the phases are compared. This is not generally sufficiently accurate because multipath ionospheric propagation and other sources of distortion may distort the phase of any one pulse non-uniformly throughout its duration so that it may be taken to have any phase, depending on the particular portion of the pulse at which the phase is evaluated.

Accordingly, it is an important object of the present invention to provide apparatus for reliably demodulating a carrier wave modulated by pulses having a predetermined phase relationship despite severe carrier wave distortions due to multipath propagation.

It is another object of the invention to provide apparatus for demodulating a carrier wave modulated by pulses having a predetermined phase relationship by comparing successive corresponding incremental portions of two successive carrier wave pulses and combining the results of the comparison to develop individual output pulses.

A further object of this invention is the provision of apparatus for demodulating a carrier wave modulated by pulses having one of four predetermined relative carrier wave phase relationships.

In accordance with the invention there is provided receiving means responsive to a carrier wave modulated by pulses having one of several such as two predetermined phase relationships. That is, the carrier wave phase of one pulse may, for example, be either in or out of phase with the carrier wave phase of a successive pulse. To the receiving means is coupled a delay line for delaying the received wave one pulse interval to produce a phase reference wave. A phase detector is coupled to the delay line and to the receiving means to compare successive incremental portions of the carrier wave pulses with the corresponding portions of the delayed pulses. This results in a series of direct-current signal portions for each pair of compared pulses having polarities dependent on the relative phase of the compared incremental pulse portions.

In accordance with another feature of this invention, there is provided an integrator circuit for combining periodic groups of successive signal portions to develop individual successive pulses for each group of signal portions. To the integrator circuit is coupled a differentiating circuit for developing output pulses in response to the individual integrated pulses. Gated clamping networks are coupled to the differentiating and integrating circuit for periodically clamping these circuits to points of fixed potential.

In accordance with still another feature of the invention, there is provided a modulator for modulating an auxiliary carrier wave with the pulse modulated carrier wave to develop a composite wave. To the modulator is coupled the wave delaying device for delaying the composite wave by one carrier wave pulse interval to produce a delayed composite wave. A demodulator is coupled to the delay line for deriving the phase reference wave from the delayed composite wave.

In accordance with yet another feature of the invention, the receiving means includes a voltage-controlled heterodyne oscillator. A network is provided for shifting the phase of the carrier wave by 90 degrees to develop a phase quadrature wave. A second phase detector is provided for comparing corresponding successive portions of coincident pulses of the phase quadrature wave and the phase reference wave. The relative phase of the output signals of the first and second phase detectors are compared in a third phase detector to develop a frequency control voltage which is applied to the oscillator for shifting the frequency thereof.

In accordance with a further feature of the invention, there is provided receiving means responsive to a carrier wave modulated by pulses, successive ones of the pulses having one of four predetermined relative phase relationships. A second phase shift network is provided for shifting the phase of the phase reference wave 45 degrees. The phase-shifted phase reference wave is compared with the carrier wave and the quadrature wave to develop first and second signals representative of the relative RF carrier phase of the two compared pulses. The first and second signals, taken together, are indicative of which one of the four predetermined relative-phase relationships is present in the two compared pulses.

For a better understanding of the invention along with other and further objects thereof, reference is made to the following description taken in connection with the accompanying drawings in which embodiments of the invention are illustrated by way of example only, like reference characters designate like parts through the figures thereof, and wherein.

Figures 1, 2, 3:
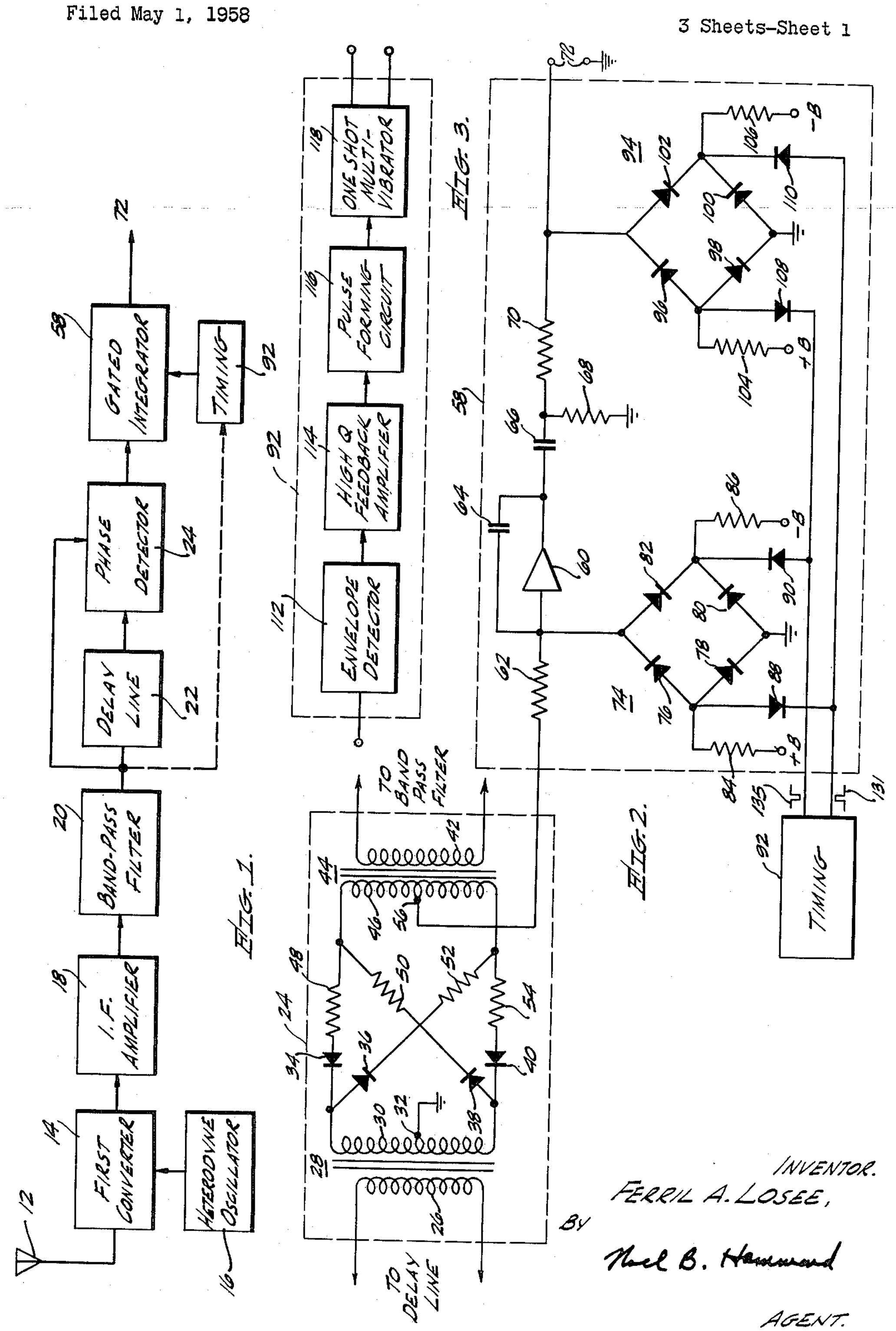
FIG. 1 is a diagram in block form of a receiver in accordance with the invention for demodulating a carrier wave modulated by pulses having one of two predetermined phase relationships.
FIG. 2 is a circuit diagram, partly in block form, of a portion of the receiver of FIG. 1.
FIG. 3 is a diagram in block form of another portion of the receiver of FIG. 1.

Referring now to FIG. 1 of the drawings, there is provided a receiver responsive to a carrier wave modulated by pulses having one of two predetermined phase relationships, that is, either an in phase or out of phase relationship. The receiver includes an antenna 12 for intercepting the modulated wave. The receiver may be of the superheterodyne type and may include a first converter 14. The first converter 14, in conjunction with a heterodyne oscillator 16, heterodynes the received wave to an intermediate frequency wave. The intermediate-frequency wave may, for example, have a frequency on the order of 100 to 500 kilocycles. An intermediate frequency amplifier 18 may be coupled to the first converter 14 to provide suitable amplification of the intermediate-frequency wave. A band-pass filter 20 may be coupled to or incorporated in the intermediate frequency amplifier 18, as is conventional, to eliminate noise, interfering signals or modulation products occurring at frequencies other than those of the intermediate-frequency wave. The band-pass filter 20 may be a mechanical or crystal filter, if desired. Thus, at the output of the filter 20, an intermediate-frequency wave modulated by pulses having a predetermined relative phase relationship is developed.

Time delaying means, such as a delay line 22, is coupled to the filter 20 for delaying the intermediate-frequency wave one pulse period in order to develop a signal-derived pulse-to-pulse phase reference wave. The delay line 22 should be responsive at the frequency of the intermediate-frequency wave. In order to pass the wave while also preserving the pulse modulation substantially undistorted, the delay line 22 should have a relatively wide pass band. The delay time of the delay line 22 is adjusted or selected to equal the pulse repetition period in order to delay the intermediate-frequency wave one pulse interval. In communication systems making use of ionospheric propagation, a pulse repetition rate of 250 or more pulses per second has been found satisfactory to assure that successive pulses receive substantially identical propagation distortions. Thus, with a pulse repetition rate of 250 pulses per second, the delay line 22 will be adjusted to provide a time delay of 4 milliseconds. The type L40 magnetostrictive delay line manufactured by the Ferranti Electric Corporation has been found to be satisfactory for the purposes of the present invention. It has a bandwidth that is relatively wide, the usable frequency range measures from about 100 kilocycles to 500 kilocycles and can be obtained with time delays of up to 5000 microseconds or 5 milliseconds. The delay line 22 used should have a relatively stable response over long periods of time regardless of temperature variations or other factors so as to produce a uniform time delay under all conditions. The type L40 magnetostrictive delay line has also been found to be quite stable. If the delay line 22 used introduces an undesirable amount of attenuation, it may be desirable to provide further amplification. Thus, at the output of the delay line 22, a phase reference wave is produced in which substantially all waveform anomalies have been preserved.

A phase detector 24 is connected to the filter 20 and the delay line 22 for comparing the relative phase of successive incremental portions of successive pulses of the intermediate-frequency wave in a manner to be explained hereinafter. In FIG. 2 is illustrated in detail a particular phase detector which has been found to be satisfactory. The delay line 22 is connected to a first phase splitter such as the primary winding 26 of a transformer 28 having a center-tapped secondary winding 30. The center tap 32 of the secondary winding 30 is grounded. To one end of the secondary winding 30 is connected the cathode of a first diode 34 and the anode of a second diode 36. To the other terminal of the secondary winding 30 is connected the anode of a third diode 38 and the cathode of a fourth diode 40. The primary winding 42 of a second phase-splitting transformer 44 having a center-tapped secondary winding 46 is connected to the band-pass filter 20. One end of the secondary winding 46 is connected by a first resistor 48 to the anode of the first diode 34 and by a second resistor 50 to the cathode of the third diode 38. The other terminal of the secondary winding 46 is similarly connected by means of a third resistor 52 to the cathode of the second diode 36 and through a fourth resistor 54 to the anode of the fourth diode 40. A pulsating direct-current signal will appear at the center tap 56 of the secondary winding 46 as will be more fully explained later.

As may be seen in FIG. 1, a gated integrator 58 is coupled to the phase detector 24 for periodically integrating the direct-current signal from the phase detector 24 to provide successive individual output pulses as will be explained later. As illustrated in detail in FIG. 2, a pulse integrating circuit forming part of the gated integrator 58 is coupled to the phase detector 24, and may be of any well known type. The particular type illustrated is that known as a Miller integrator in which an amplifier 60 is provided to linearize the action of the integrator. A resistor 62 is connected from the center tap 56 of the secondary winding 46 of the transformer 44 to the input of the amplifier 60. An integrating capacitor 64 is coupled between the input and the output of the amplifier 60 and the integrated voltage appears at the output of the amplifier 60. It will be understood that the time constant of the integrating circuit including the resistor 62 and the capacitor 64 should be adjusted or selected to obtain proper integration for the signal to be integrated. The gain of the amplifier 60 should be adjusted to provide linear integration.

To the pulse integrating circuit 60, 62, 64, is connected a pulse differentiating circuit. The differentiating circuit may be a capacitor 66 connected from the output of the amplifier 60 to a resistor 68 which is connected to ground. The time constant of the resistor 68 and capacitor 66 should be adjusted to produce a sharp pulse at the output of the differentiating circuit suitable for actuating or triggering any circuits connected thereto. One end of a resistor 70 is connected to the junction of the differentiating resistor 68 and capacitor 66. The other end of the resistor 70 is connected to one of a pair of output terminals 72, the other being grounded.

The pulse integrating circuit 60, 62, 64 and the pulse differentiating circuit 66, 68 are periodically clamped to a fixed potential to terminate the integration and to eliminate noise and transients at the output terminals 72. To this end a first clamping circuit 74 is coupled to the integrating circuit 60, 62, 64. The clamping circuit 74 includes four clamping diodes 76, 78, 80, 82 connected in a bridge configuration.

The anode of the first diode 76 is connected to the anode of the second diode 78; the cathode of the second diode 78 is connected to the anode of the third diode 80, the cathode of the third diode 80 is connected to the cathode of the fourth diode 82; and the anode of the fourth diode 82 is connected to the cathode of the first diode 76.

The junction of the first and fourth diodes 76, 82 is connected to the input of the integrator amplifier 60 and the junction of the second and third diodes 78, 80 is connected to ground. The clamping bridge 74 is biased to be normally conductive by a source of bias potential indicated as +B and −B. The junction of the first and second diodes 76, 78 is connected to a positive potential +B which may provide 150 volts through a resistor 84. The junction of the third and fourth diodes 80, 82 is connected to a negative potential −B of 150 volts through resistor 86. The resistors 84, 86 cause the source of bias potential +B and −B to appear as a high impedance source, and may each have a resistance on the order of 1 megohm.

Figure 4:
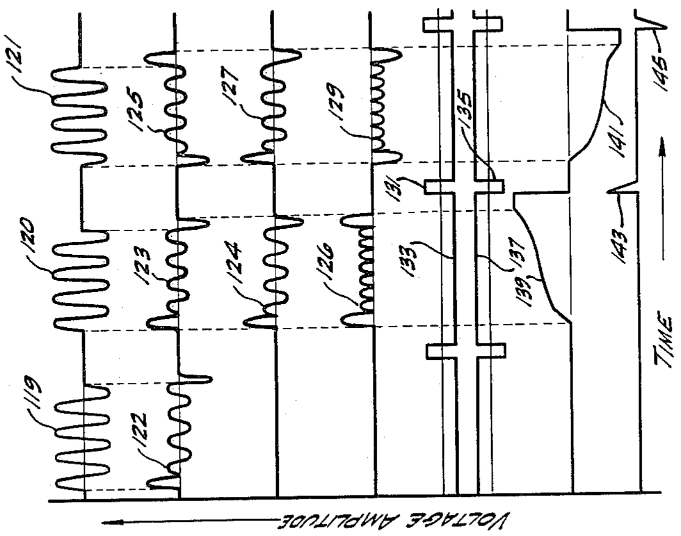
FIG. 4 is a graph illustrating wave forms which will assist in understanding the operation of the receiver of FIG. 1.

A pair of gating diodes 88, 90 connect the first clamping circuit 74 to a source of gating pulses such as a timing circuit 92 for periodically rendering the clamping circuit 74 nonconductive. The first gating diode 88 has its anode connected to the junction of the first and second clamping diodes 76, 78 and its cathode connected to the timing circuit 92. Referring now to FIG. 4 in which the abscissa represents time and the ordinate is voltage amplitude, the first gating diode 88 is supplied with long pulses 133 which may be 15 volts negative alternating with short pulses 131 which may be 15 volts positive. The second gating diode 90 has its cathode connected to the junction of the third and fourth clamping diodes 80, 82 and its anode connected to the timing circuit 92. It is supplied with long pulses 137 (FIG. 4) which may be 15 volts positive alternating with short pulses 135 which may be 15 volts negative. The short positive pulses 131 and short negative pulses 135 are in time coincidence and are synchronized to occur during intervals between pulses 122, 123, 125 of the received carrier wave (see FIG. 4).

Similarly, a second clamping circuit 94 is connected from one of the output terminals 72 to ground. The second clamping circuit 94 may include four diodes 96, 98, 100, 102 in a bridge configuration identical with that of the first clamping circuit 74. The second clamping circuit 94 is also coupled to the source of biasing potential +B, −B through resistors 104, 106. The second clamping circuit 94 is also biased to be normally conductive and the resistors 104, 106 again serve to cause the source of biasing potential +B, −B to appear as a high impedance source. The second clamping circuit 94 is also connected to the timing circuit 92 by a pair of gating diodes 108, 110. However, the second clamping circuit 94 is gated differently than is the first clamping circuit 74. That is to say, the first gating diode 108 of the second clamping circuit 94 impresses the short negative pulses 135 alternating with long positive pulses 137 on the junction of the first and second clamping diodes 96, 98 and the second gating diodes 110 impresses the short positive pulses 131 alternating with long negative pulses 133 to the junction of the third and fourth diodes 100, 102. To the output terminals 72 of the gated integrator 58 may be coupled utilization circuits such as a Teletype or facsimile printer.

The timing circuit 92 may be part of the normal system timing circuits of the receiver. The timing pulses may also be derived, if desired, from a crystal oscillator. In FIG. 3 there is illustrated a timing arrangement which has been found to be satisfactory. An envelope detector 112 is coupled to the receiver and develops the pulse modulation envelope from the carrier wave by rectification and filtering. A high Q feedback amplifier 114 or other type of ringing or regenerative circuit is coupled to the envelope detector 112. The feedback amplifier 114 will cause timing pulses to be supplied even when the carrier wave is temporarily not being received. A pulse forming circuit 116 may be coupled to the feedback amplifier 114 for developing trigger pulses at the repetition rate of the carrier wave pulse modulation. A monostable or one shot multivibrator 118 may be coupled to the pulse forming circuit 116. In response to the trigger pulses, the multivibrator 118 will provide the timing pulses 131, 133, 135, 137 synchronized to the pulse repetition rate of the carrier wav of equal amplitudes and of opposite polarities.

In operation, a carrier wave modulated by pulses having a predetermined phase relationship may be developed in any well known manner such as that shown in U.S. Patent 2,676,245 to Doelz. Referring now to FIG. 4, pulses 119, 120, 121 are representative of such a transmitted carrier wave. It will be understood, of course, that the number of cycles shown in a given pulse has been reduced for clarity of illustration. Additionally, the modulation is shown as square wave modulation; however, it will be understood that any other type of shaped pulse such as sine-squared pulse modulation may be used.

Pulses 119 and 120 will be seen from FIG. 4 to have the same relative carrier wave phase. This indicates one predetermined relative phase. Pulses 120 and 121 will be seen to have the opposite relative phase. One of these predetermined phase relationship can be taken to indicate a mark and the other phase relationship can be taken to indicate a space. By this means digital information can be conveyed and can be coded into the standard 5 symbol radio-Teletype code or any other suitable code. It will be understood that although a two-phase-state system of modulation is described in connecnection with FIGS. 1–4, that other forms of modulation may be used. For instance, in a four-phase-state modulation system to be described in connection with FIG. 7, the relative phases of successive pulses may be zero, 90, 180 or 270 degrees instead of the zero and 180 degree relationships utilized in a two-phase-state system.

If the transmitted wave is propagated with the aid of the ionosphere or other method which may give rise to multiple paths, an individual wave for each path taken by the original wave will be received. These individual waves may be called components of the original wave. The different transmitted wave components may be subject to varying amounts of phase shift and time delay. The result is that when the components are received and combined at the receiver, phase distortion, total or partial cancellation, phase changes throughout the pulses, and stretching of the pulses may be encountered.

The pulses 122, 123, 125 of FIG. 4 illustrate a typical distorted waveform as received. These pulses 122, 123, 125 represent two components of pulses 119, 120, 121 combined, the one component being shifted in phase 180 degrees with respect to the other, arriving later by half a cycle and being of a lesser amplitude. It will be noted that if pulses 122, 123, 125 were demodulated by comparing them to an absolute phase reference wave, satisfactory results would not be obtained. Additionally, it will be noted that if a pulse-to-pulse phase reference wave were used in which the received pulses are regenerated in a ringing circuit or are used to synchronize a local oscillator, satisfactory results would not be obtained. As will be seen from FIG. 4, if an attempt were made to determine the absolute phase of one of the received pulses 122, 123, 125, no decision could be made inasmuch as the phase of the pulse is not constant through the pulse duration. It will be understood that the pulse repetition time is assumed to be short compared to the rate of change of the phase distortions introduced into the pulses. Thus, successive pulses have substantially the same distortions throughout the duration of the pulse. Satisfactory operation has been obtained with pulses of 2 milliseconds' duration having 2 millisecond intervals between pulses.

The pulses 122, 123, 125 of FIG. 4 represent the carrier wave to which the receiver is responsive. The carrier wave is heterodyned to an intermediate-frequency wave by the first converter 14, amplified by the intermediate-frequency amplifier 18 and passed through the band-pass filter 20 where undesired noise, unwanted signals and modulation products are removed.

The intermediate-frequency wave is applied to the delay line 22 where it is delayed one pulse interval without substantial waveform distortion in order to develop a signal-derived phase reference wave in which substantially all wave-form non-uniformities have been preserved. This phase reference wave is illustrated as pulses 124 and 127 which represent pulses 122 and 123 respectively, delayed one pulse interval. It will be observed that pulses 123 and 124 are in time coincidence and pulses 125 and 127 are in time coincidence. By comparing the relative phase of these coincident pulses, there is in effect made a comparison of the relative phase of successive received pulses 122, 123, 125.

The phase reference wave is applied to the primary winding 26 of one transformer 28 of the phase detector 24 and the intermediate-frequency wave is applied to the primary winding 42 of the other transformer 44. At the secondary winding 30 of the transformer 28 equal and opposite voltages derived from the reference wave appear and at the secondary winding 46 of the other transformer 44 equal and opposite voltages representative of the intermediate-frequency wave appear.

Successive incremental portions of the intermediate-frequency wave pulses will be compared with corresponding incremental portions of the phase reference wave pulses which are in time correspondence with them. For example, assume that the voltage at the top of the secondary winding 30 is positive and at the same time the top of the secondary winding 46 has a positive voltage, then the bottom of the two secondary windings 30 and 46 will be negative. Diode 36 will be conductive and the other diodes will be nonconductive. As long as the voltages at the secondaries 30, 46 continue to have this relative polarity, a current will flow through resistor 52 and diode 36 which will produce a negtaive voltage at the center tap 56 of transformer 44.

If the polarities of the voltages at the transformer secondaries 30, 46 change so that the voltages are negative at the top of each winding and positive at the bottom of the windings, the diode 38 will become conductive and each of the other diodes 34, 36 and 40 will be nonconductive. Current will flow through resistor 50 and diode 38 which will again produce a negative voltage at center tap 56.

If, on the other hand, the polarity of the voltage at secondary winding 30 is positive at the top and negative at the bottom and the polarity of the voltage at secondary winding 46 is negative at the top and positive at the bottom, diode 40 becomes conductive and a voltage drop is developed across the resistor 54 which produce a positive voltage at the center tap 56. In like manner, if the voltage at secondary 30 is negative at the top and positive at the bottom and the voltage at secondary 46 is positive at the top and negative at the bottom, diode 34 will be conductive and a voltage drop is developed across resistor 48 which provides a positive voltage at the center tap 56. Thus, it can be seen that as long as two pulses being compared remain in phase, a pulsatign voltage of one polarity will appear at center tap 56, and as long as the pulses being compared remain out-of-phase a pulsating voltage having the opposite polarity will apear.

If the two voltages at the secondary windings 30, 46 of the transformers 28, 44 are neither completely in phase nor completely out of phase, the in-phase component will produce a voltage across one of the resistors 50 or 52 and the out-of-phase component will produce a voltage across theother of the resistors 48 or 54 and the algebraic sum of the two voltages will be the output signal of the phase detector 24.

It will be understood that one of the primary windings 26 or 42 may have its connections reversed in order to secure whichever polarity is desired at the center tap 56 for in-phase or out-of-phase conditions.

Thus, it will be understood that received pulse 122 is delayed to produce phase reference pulse 124 which is in time coincidence with received pulse 123. Successive incremental portions of pulses 123 and 124 are then compared to produce the pulsating direct-current signal 126. In like manner, received pulse 123 is delayed one pulse period to produce reference pulse 127 which is in time correspondence with received pulse 125. Pulses 125 and 127 are compared to produce pulsating direct-current signal 129. Inasmuch as pulses 122 and 123 have the same relative phase, the direct-current signal 126 has one polarity. Because pulses 123 and 125 have opposed relative phases, the direct-current signal 129 has the opposite polarity.

The direct-current signals 126 are applied to the integrating circuit where they are integrated to develop a composite pulse for each pair of compared pulses. Pulse 139 represents the result of integrating direct-current signal 126 and pulse 141 is the result of integrating signal 129. The long gating pulses 133, 137 developed by the timing circuit 92 permit the first clamping circuit 74 to remain biased to a nonconductive state during the time when the direct-current signal 126 is being integrated. In the intervals between received pulses 122, 123 and 125, the short gating pulses 131, 135 overcome the bias voltage applied to the first clamping circuit 74 and cause it to become conductive which discharges the integrating circuit and terminates the composite pulse 139.

The differentiating circuit receives the composite pulse 139 and in response to the trailing edge thereof produces an output pulse 143 which appears at the output terminals 72. The long gating pulses 133, 137 overcome the bias voltage applied to the second clamping circuit 94 causing it to be in a conductive state during the occurrence of received pulses 123, 125 but the short gating pulses 131, 135 permit it to return to the biased or nonconductive state during the interval between pulses 123, 125. Thus, there are developed at the output terminals 72 successive individual output pulses 143, 145 preceded and followed by periods free from noise and transients. These output signals 143, 145 thus represent by their polarity the relative phase of pulses 122, 123, 125 of the incoming carrier wave.

Figure 5:
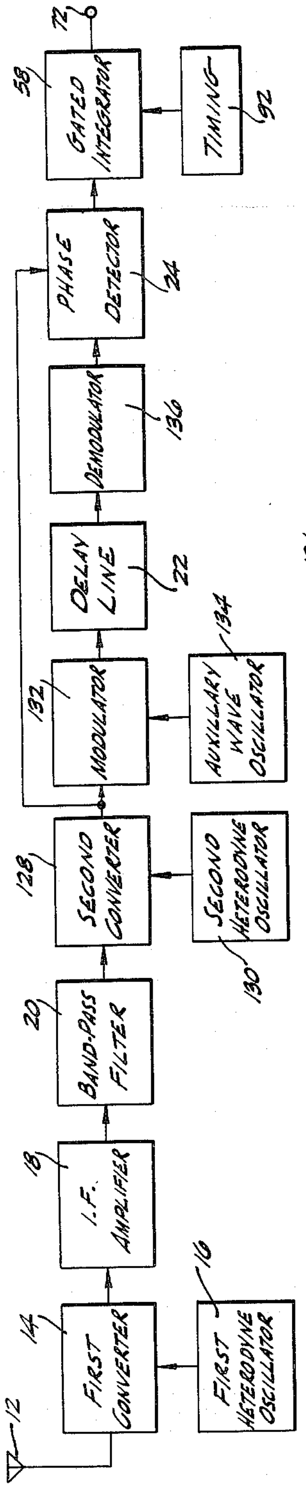
FIG. 5 is a block diagram of a second embodiment of a receiver in accordance with the invention for demodulating a carrier wave modulated by pulses having one of two predetermined relationships.

It will sometimes be found that a particular delay line 22 is not sufficiently stable to maintain a constant time delay over long periods. In such cases it has been found convenient to modulate the carrier wave onto an auxiliary carrier wave for transmission through the delay line 22 and then demodulate it thereafter. Such a system is illustrated in FIG. 5. The receiver of FIG. 5 may be identical to that of FIG. 1 except that a second converter 128 may be coupled to the band-pass filter 20, including a second heterodyne oscillator 130. The second converter 128 heterodynes the intermediate-frequency wave to a wave of a lower frequency such as, for example, 10 kilocycles. To the second converter may be coupled a modulator 132 including an auxiliary wave oscillator 134. The modulator 132 modulates the lower frequency wave onto an auxiliary carrier wave developed by the oscillator 134 to produce a composite wave. The frequency of the auxiliary wave may be 350 kilocycles, for example. This composite wave is then coupled to the delay line 22 where it is delayed one pulse interval. The line 22 should, of course, be responsive to the composite wave. A demodulator 136 is coupled to the delay line 22 for recovering from the delayed composite wave a delayed low frequency wave. This delayed low frequency wave will then serve as a phase reference as in the system of FIG. 1. Thus, any instabilities in the delay line 22 will introduce negligible phase distortion into the phase reference wave.

Figure 6:
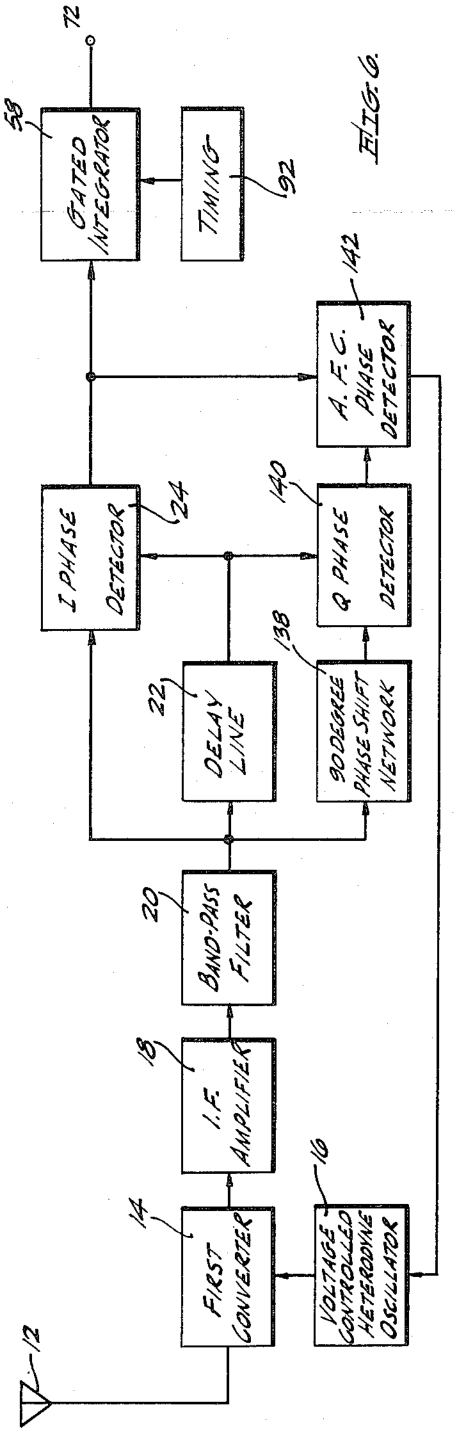
FIG. 6 is a block diagram of an automatic frequency control system which may be incorporated into a receiver of the present invention.

Another satisfactory expedient for overcoming the deleterious effects of an unstable delay line 22 is to utilize an automatic frequency control system for varying the frequency of the wave propagated down the delay line 22 in accordance with the frequency variations, and hence the phase variations, caused by the delay line 22 itself. Such a system in accordance with the invention, is illustrated in FIG. 6. The automatic frequency control system is shown applied to the receiver of FIG. 1 in which the receiving and phase detection apparatus remain the same. The heterodyne oscillator 16 is adapted for voltage control of its frequency by well known means such as a reactance tube, for example. To the band-pass filter 20 is coupled a phase shift network 138. The phase shift network is adjusted or selected to produce a 90 degree shift in phase of the intermediate-frequency wave. Thus, the phase shift network 138 produces what may be termed a phase quadrature wave. A second phase detector 140, which may be termed a quadrature phase detector or Q phase detector is coupled to the phase shift network 138 and to the delay line 22. The Q phase detector 140 may be identical to the phase detector 24 illustrated in FIG. 2. The Q phase detector 140 also compares corresponding pulses of the phase reference wave and the phase quadrature wave to produce second direct-current signals. The phase of the envelope of the first and second direct-current signals are compared in an automatic frequency control (AFC) phase detector 142 to produce a control voltage which is applied to the heterodyne oscillator 16 to change the frequency thereof. The AFC phase detector 142 may be identical to the phase detector 24 of FIG. 2 except that it may also include a simple low pass filter such as a resistor and capacitor in series with the primary windings of the transformers in order to develop the envelopes of the first and second direct-current signals.

When the frequency is correct, the direct-current signals of the first or in-phase detector 24 which may also be termed the I phase detector should be either at a maximum positive or a maximum negative value depending upon the binary digit that was transmitted. The direct-current signals of the Q phase detector 140 should be zero at that time. If the frequency is not correct, there will be direct-current signals from both phase detectors 24, 140. For frequencies that are high, the first and second direct-current signals will have the same polarity whereas for low frequencies the first and second direct-current signals will have opposite polarities. The AFC detector 142 compares the phase of the first and second direct-current signals and yields a voltage of the proper polarity to shift the frequency of the heterodyne oscillator 16 in the proper direction to bring it back to normal.

Figure 7:
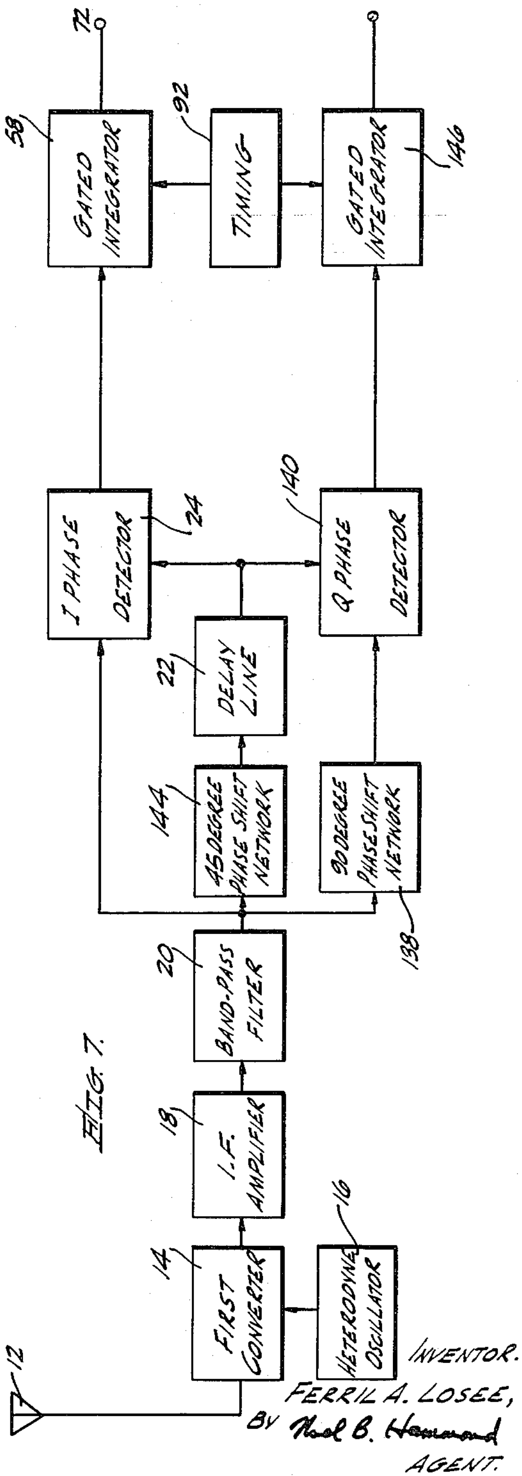
FIG. 7 is a diagram in block form of a receiver in accordance with the invention for demodulating a carrier wave modulated by pulses having one of four predetermined phase relationships.

Referring now to FIG. 7, there is illustrated a receiving system for demodulating a carrier wave modulated by pulses having one of four predetermined relative phase relationships. The four phase relationships may be in phase, 90 degrees out of phase, 180 degrees out of phase, and 270 degrees out of phase. The receiver may be generally the same as that of FIG. 6 except that a phase shift network 144 is coupled between the band-pass filter 20 and the delay line 22. This phase shift network 144 is adjusted or selected to shift the phase of the intermediate-frequency wave 45 degrees. If deemed desirable, the phase shift network 144 may be combined with the delay line 22 as, by merely adjusting the delay time of the delay line 22, a 45 degree phase shift may be obtained. The I phase detector 24 and the Q phase detector 140 develop first and second direct-current signals. First and second gated integrators 58, 146 coupled to the phase detectors 24, 140 integrate the first and second direct-current signals. At the output of the first and second gated integrators 58, 146 will appear first and second output pulses in time coincidence with each other. The respective polarities of the first and second output pulses taken together will be indicative of which of the four predetermined relative phase relationships of successive carrier wave pulses was transmitted. Thus twice the amount of information may be transmitted on a single channel.

There has thus been described a receiver for demodulating a carrier wave modulated by pulses having a predetermined phase relationship which will operate reliably despite severe carrier wave distortions due to multi-path propagation by comparing successive corresponding incremental portions of two successive carrier wave pulses and integrating the resulting signals. There has further been described apparatus for demodulating a carrier wave modulated by pulses having one of four predetermined carrier wave phase relationships.

The described apparatus has been found to be very reliable and accurate in operation. Extensive tests have been made between points separated by several thousands of miles at particularly unfavorable carrier wave frequencies and at reduced transmitter power levels. The error rate of the system was usually less than one percent and rarely exceeded 10 percent under extremely adverse conditions. These tests indicate that this system is superior to other systems such as frequency-shift radio-telegraph systems.

What is claimed is:

1. Apparatus for demodulating a first carrier wave modulated by pulses having a predetermined carrier wave phase relationship to convey binary information comprising: receiving means responsive to the carrier wave for developing a second carrier wave, modulating means coupled to said receiving means for modulating the amplitude of an auxiliary carrier wave by said second wave to produce a composite wave, a delay line coupled to said modulating means for delaying said composite wave by one pulse period, said delay line being responsive to said composite wave and non-responsive to said second carrier wave, a demodulator coupled to said delay line for recovering from said delayed composite wave a delayed carrier wave which is delayed one pulse period with respect to said second carrier wave, said delayed carrier wave thereby providing a signal-derived phase reference wave in which substantially all waveform non-uniformities are preserved, phase comparison means coupled to said receiving means and to said demodulator for incrementally comparing instantaneous portions of pulses of said second carrier wave with corresponding pulse portions of said delayed carrier wave which are in time coincidence with each other, whereby incremental signals are produced, and means coupled to said comparison means for combining said incremental signals to develop individual successive output pulses having polarities indicative of the binary information conveyed by successive pulses of said first carrier wave.

2. In combination with signal receiving apparatus, a delay line coupled to said signal receiving apparatus, a relative-phase detector coupled to said delay line and to said signal receiving apparatus, a first clamping circuit coupled to said detector for periodically clamping said detector at a first fixed potential, an integrating circuit coupled to said detector, a differentiating circuit coupled to said integrating circuit, and a second clamping circuit coupled to said differentiating circuit for periodically clamping said differentiating circuit at a second fixed potential.

3. Apparatus for demodulating a carrier wave modulated by signal pulses, successive carrier wave pulses having relative phases indicative of binary intelligence to be conveyed comprising: a delay line for deriving delayed signal pulses from said carrier wave pulses, a phase detector coupled to said delay line and responsive to said delayed signal pulses and said carrier wave pulses for comparing the relative phase of successive portions of each carrier wave pulse with corresponding portions of the delayed preceding signal pulse to produce auxiliary pulse portions whose polarity is indicative of the relative phase of the compared pulse portions, and a gated integrator network coupled to said phase detector for periodically integrating said auxiliary pulse portions over successive pulse periods to produce successive output pulses whose polarity is representative of the intelligence.

4. A demodulator for demodulating a carrier wave modulated by pulses having a predetermined phase relationship comprising: a wave delaying network for delaying each of said pulses by one pulse interval to derive a train of delayed pulses, each of which is substantially identical with an original pulse, a phase detector coupled to said network for comparing the relative phase of incremental portions of each original pulse with corresponding incremental portions of the delayed pulse in time coincidence therewith, clamping means coupled to said detector for maintaining said detector at a first fixed potential during time intervals between pulses, an integrating circuit coupled to said detector, a differentiating circuit coupled to said integrating circuit, and clamping means coupled to said differentiating circuit for maintaining said differentiating circuit at a second fixed potential during the occurrence of pulses.

5. In combination, a pulse integrating circuit for integrating periodically recurring pulses applied thereto to develop integrating pulses, a pulse differentiating circuit coupled to said pulse integrating circuit and responsive to said integrated pulses, means maintaining said pulse integrating circuit at a first fixed potential between predetermined intervals, and means maintaining said pulse differentiating circuit at a second fixed potential during said predetermined intervals, whereby said periodically recurring pulses are combined into single composite pulses, said composite pulses periodically occurring intermediate said predetermined intervals, and whereby intervals between said single composite pulses are devoid of noise and transients.

6. A pulse comparison circuit comprising: means for comparing the relative phase of successive incremental portions of a carrier wave pulse with the corresponding incremental portions of a successive carrier wave pulse to develop auxiliary pulse portions having polarities dependent upon the relative phase of said compared carrier wave pulse portions, an integrating circuit coupled to said comparing means for integrating said auxiliary pulse portions to develop a composite pulse, a first gated clamping network coupled to said integrating circuit for clamping said integrating circuit at a first fixed potential during intervals between carrier wave pulses, a differentiating circuit coupled to said integrating circuit to provide an output pulse in response to the occurrence of the terminal portion of said composite pulse, and a second gated clamping network coupled to said differentiating circuit for clamping said differentiating circuit at a second fixed potential during the occurrence of carrier wave pulses.

7. In combination, a pulse integrating circuit, a pulse differentiating circuit coupled to said pulse integrating circuit, an impedance element having one end coupled to said differentiating circuit, a first clamping circuit coupled to said integrating circuit for periodically conductively connecting said integrating circuit to a first point of fixed potential, a source of biasing potential coupled to said first clamping circuit for biasing said first clamping circuit to a normally conductive state, a first pair of gating diodes coupled to said first clamping circuit, a source of gating pulses coupled to said first pair of gating diodes for periodically changing said first clamping circuit from said normally conductive state to a nonconductive state, a second clamping circuit coupled to the other end of said impedance element for periodically conductively connecting the other end of said impedance element to a second point of fixed potential, said source of biasing potential being coupled to said second clamping circuit for biasing said second clamping circuit to a normally conductive state, and a second pair of gating diodes coupled to said second clamping circuit, said source of gating pulses being coupled to said second pair of gating diodes for periodically changing said second clamping circuit from said normally conductive state to a nonconductive state.

8. A receiver for a carrier wave modulated by pulses having a predetermined phase relationship comprising: a converter responsive to said carrier wave for producing an intermediate-frequency wave, a delay line coupled to said converter for delaying said intermediate-frequency wave by the time interval between successive pulses while passing said pulses substantially undistorted, a phase detector coupled to said delay line and to said converter for comparing the relative phase of successive pulses to produce direct-current signals for each pair of compared pulses, a pulse integrating circuit coupled to said phase detector for combining said direct-current signals to develop composite pulses, a pulse differentiating circuit coupled to said pulse integrating circuit for producing output pulses in response to the occurrence of the trailing edges of said composite pulses, an impedance element having one end coupled to said differentiating circuit, a first clamping circuit coupled to said integrating circuit for periodically conductively connecting said integrating circuit to a first point of fixed potential, a source of biasing potential coupled to said first clamping circuit for biasing said first clamping circuit to a normally conductive state, a first pair of gating diodes coupled to said first clamping circuit, a source of gating pulses synchronized with said carrier wave pulses and coupled to said first pair of gating diodes for periodically changing said first clamping circuit from said normally conductive state to a non-conductive state, a second clamping circuit coupled to the other end of said impedance element for periodically conductively connecting the other end of said first impedance element to a second point of fixed potential, said source of biasing potential being coupled to said second clamping circuit for biasing said second clamping circuit to a normally conductive state, and a second pair of gating diodes coupled to said second clamping circuit, said source of gating pulses being coupled to said second pair of gating diodes for periodically changing said second clamping circuit from said normally conductive state to a nonconductive state, said first clamping circuit being changed to a conductive state during intervals in which said second clamping circuit is in said normally nonconductive state, whereby said output pulses are developed at the other end of said impedance element preceded and followed by substantially noise and transient-free intervals.

9. A receiver for demodulating a carrier wave modulated by pulses having a predetermined phase relationship comprising: a first converter responsive to the carrier wave for producing an intermediate-frequency wave, a delay line coupled to said converter for delaying said intermediate-frequency wave by the time interval between successive pulses while passing said pulses substantially undistorted, a phase detector coupled to said delay line and to said converter for comparing the relative phase of successive ones of said carrier wave pulses to produce first direct-current signals for each pair of compared pulses, a first gated integrator circuit coupled to said phase detector for integrating said first direct-current signals to produce a first train of composite pulses, said gated integrator circuit including a first differentiating circuit for providing a first train of successive single output pulses having one polarity when two successive ones of said carrier wave pulses have substantially the same relative carrier wave phase and having the opposite polarity when two successive ones of said carrier wave pulses have a substantially opposed relative carrier wave phase, and a timing circuit coupled to said gated integrator circuit for supplying gating pulses thereto at the pulse repetition rate and synchronized with the modulated carrier wave.

10. The combination of claim 9 which additionally includes a second converter coupled between said first converter and said delay line for converting said intermediate frequency wave to a low frequency wave having a frequency less than the frequency of said intermediate-frequency wave, a modulator coupled between said second converter and said delay line for modulating an auxiliary carrier wave with said low frequency wave to produce a composite wave, said auxiliary wave having a frequency higher than the frequency of said low frequency wave, and a demodulator coupled between said delay line and said phase detector for recovering from said composite wave a delayed low frequency wave, said phase detector being coupled to said second converter and to said demodulator.

11. The combination of claim 9 in which said first converter includes a voltage controlled oscillator and which additionally includes a phase shift network coupled to said first converter for shifting the phase of said intermediate-frequency wave 90 degrees to produce a phase quadrature wave, a quadrature phase detector coupled to said phase shift network and to said delay line for comparing said delayed intermediate-frequency wave with said phase quadrature wave to produce quadrature signals indicative of the relative phase of successive pulses of said delayed intermediate-frequency wave and said phase quadrature wave, and a differential phase detector coupled to said quadrature phase detector and to said phase detector, said oscillator being coupled to said differential phase detector, said differential phase detector being responsive to said quadrature signals and to said direct-current signals for applying a resultant voltage to said oscillator to vary the frequency thereof.

12. The combination of claim 9 which additionally includes a 45 degree phase shift network coupled between said first converter and said delay line for shifting the phase of said intermediate-frequency wave 45 degrees, a 90 degree phase shift network coupled to said first converter and responsive to said intermediate-frequency wave for producing a phase quadrature wave, a quadrature phase detector coupled to said delay line and to said 90 degree phase shift network for comparing the relative phase of successive ones of said carrier wave pulses to produce second direct-current signals for each pair of compared pulses, and a second gated integrator circuit coupled to said quadrature phase detector and said timing circuit for integrating said second direct-current pulses to produce a second train of composite pulses, said second gated integrator circuit including a second differentiating circuit for providing a second train of successsive single output pulses having said one polarity when two successive ones of said carrier wave pulses have substantially the same relative carrier wave phase or when the later of said two successive pulses has a carrier wave phase substantially 90 degrees lagging that of the earlier of said two successive pulses, said second train of successive single output pulses having said opposite polarity when said two successive pulses have a substantially opposed relative carrier wave phase or when the later of said two successive pulses has a carrier wave phase substantially 90 degrees leading that of the earlier of said two successive pulses, said first train of successive single output pulses having said one polarity when the later of said two successive pulses has a carrier wave phase substantially 90 degrees leading that of the earlier of said two successive pulses and said opposite polarity when the later of said two successive pulses has a carrier wave phase substantially 90 degrees lagging that of the earlier of said two successive pulses.

13. Pulse comparison apparatus comprising: a modulator responsive to a carrier wave modulated by pulses having a predetermined phase relationship for modulating an auxiliary carrier wave with the pulse-modulated carrier wave to provide a composite wave, pulse comparison means responsive to the pulse-modulated carrier wave, wave delaying means coupled to said modulator for delaying said composite wave by the time interval between successive pulses, and a demodulator coupled between said wave delaying means and said pulse comparison means for deriving from said delayed composite wave and supplying to said pulse comparison means a delayed pulse-modulated carrier wave.

14. A receiver for demodulating a carrier wave modulated by pulses, successive ones of said carrier wave pulses having one of four predetermined carrier wave phase relationships comprising: means for receiving the carrier wave, first phase-shifting means coupled to said receiving means for developing a phase-shifted wave shifted in phase 45 degrees with respect to said modulated carrier wave, wave delaying means coupled to said first phase-shifting means for delaying said phase-shifted wave one pulse period to develop a phase reference wave, second phase-shifting means coupled to said receiving means and responsive to said modulated carrier wave for developing a phase quadrature wave, first phase comparison means coupled to said receiving means and to said wave delaying means for instantaneously comparing corresponding incremental portions of said modulated carrier wave and said phase reference wave to produce first output signals representative of the relative phase of corresponding pulses thereof, second phase comparison means coupled to said second phase-shifting means and to said wave delaying means for instantaneously comparing corresponding incremental portions of said phase quadrature wave and said phase reference wave to produce second output signals representative of the relative phase of corresponding pulses thereof, integrating means coupled individually to said first and second phase comparison means, and timing means coupled to said integrating means and synchronized to the repetition period of said carrier wave pulses.

15. Apparatus for demodulating a carrier wave modulated by signal pulses, successive carrier wave pulses having relative phases indicative of binary intelligence to be conveyed comprising: delay means for deriving delayed signal pulses from said carrier wave pulses, phase comparison means coupled to said delay means and responsive to said delayed signal pulses and said carrier wave pulses for comparing the relative phase of successive portions of each carrier wave pulse with corresponding portions of the delayed preceding signal pulse to produce auxiliary pulse portions whose polarity is indicative of the relative phase of the compared pulse portions, and a gated integrator coupled to said phase comparison means for periodically integrating said auxiliary pulse portions over successive pulse periods to produce successive output pulses whose polarity is representative of the intelligence.

16. Apparatus for demodulating a carrier wave modulated by signal pulses, successive carrier wave pulses having relative phases indicative of binary intelligence to be conveyed comprising: delay means for deriving delayed signal pulses from said carrier wave pulses, phase comparison means coupled to said delay means and responsive to said delayed signal pulses and said carrier wave pulses for comparing the relative phase of successive portions of each carrier wave pulse with corresponding portions of the delayed preceding signal pulse to produce auxiliary pulse portions whose polarity is indicative of the relative phase of the compared pulse portions, and gated integrating means coupled to said phase comparison means for periodically integrating said auxiliary pulse portions over successive pulse periods to produce successive output pulses whose polarity is representative of the intelligence.

17. Apparatus for demodulating a carrier wave modulated by signal pulses, successive carrier wave pulses having relative phases indicative of binary intelligence to be conveyed comprising: delay means for deriving delayed signal pulses from said carrier wave pulses, phase comparison means coupled to said delay means and responsive to said delayed signal pulses and said carrier wave pulses for comparing the relative phase of successive portions of each carrier wave pulse with corresponding portions of the delayed preceding signal pulse to produce auxiliary pulse portions whose polarity is indicative of the relative phase of the compared pulse portions, and integrating means coupled to said phase comparison means for periodically integrating said auxiliary pulse portions over successive pulse periods to produce successive output pulses whose polarity is representative of the intelligence.

References Cited in the file of this patent

UNITED STATES PATENTS

| | | |
|---|---|---|
| 1,901,642 | Hansell | Mar. 14, 1933 |
| 2,272,840 | Hammond et al. | Feb. 10, 1942 |
| 2,532,546 | Forbes | Dec. 5, 1950 |
| 2,676,245 | Doelz | Apr. 20, 1954 |
| 2,796,556 | Larew | June 18, 1957 |
| 2,828,417 | Fleming et al. | Mar. 25, 1958 |
| 2,850,627 | Moore et al. | Sept. 2, 1958 |
| 2,859,522 | Bachmann | Oct. 14, 1958 |